(12) United States Patent
Pekala

(10) Patent No.: US 7,267,909 B2
(45) Date of Patent: Sep. 11, 2007

(54) BATTERY SEPARATORS CONTAINING REACTIVE FUNCTIONAL GROUPS

(75) Inventor: Richard W. Pekala, Corvallis, OR (US)

(73) Assignee: Amtek Research International LLC, Lebanon, OR (US)

( * ) Notice: Subject to any disclaimer, the term of this patent is extended or adjusted under 35 U.S.C. 154(b) by 0 days.

(21) Appl. No.: 10/857,037

(22) Filed: May 28, 2004

(65) Prior Publication Data

US 2004/0248012 A1    Dec. 9, 2004

Related U.S. Application Data

(60) Provisional application No. 60/476,446, filed on Jun. 6, 2003.

(51) Int. Cl.
    *H01M 2/16*     (2006.01)
(52) U.S. Cl. ............... 429/254; 429/250; 429/144
(58) Field of Classification Search ............... None
    See application file for complete search history.

(56) References Cited

U.S. PATENT DOCUMENTS

| | | | |
|---|---|---|---|
| 4,298,668 A * | 11/1981 | Schmidt et al. ............ 429/250 |
| 5,051,183 A | 9/1991 | Takita et al. ............ 210/500.36 |
| 5,300,562 A | 4/1994 | Coventry et al. ............ 524/841 |
| 5,473,012 A | 12/1995 | Coventry et al. ............ 524/841 |
| 5,525,706 A | 6/1996 | Gruber et al. ............ 528/354 |
| 5,679,482 A | 10/1997 | Ehrenberg et al. ............ 429/249 |
| 5,786,396 A | 7/1998 | Takita et al. ............ 521/64 |
| 5,807,973 A | 9/1998 | Gruber et al. ............ 528/354 |
| 5,830,554 A | 11/1998 | Kaimai et al. ............ 428/131 |
| 5,853,633 A | 12/1998 | Kono et al. ............ 264/54 |
| 5,853,916 A * | 12/1998 | Venugopal et al. ............ 429/303 |
| 5,922,492 A | 7/1999 | Takita et al. ............ 429/249 |
| 6,054,498 A | 4/2000 | Hasegawa et al. ............ 521/64 |
| 6,111,060 A | 8/2000 | Gruber et al. ............ 528/354 |
| 6,153,133 A | 11/2000 | Kaimai et al. ............ 264/41 |
| 6,168,858 B1 | 1/2001 | Hasegawa et al. ....... 428/315.5 |
| 6,245,272 B1 | 6/2001 | Takita et al. ............ 264/210.4 |
| 6,355,772 B1 | 3/2002 | Gruber et al. ............ 528/354 |
| 2001/0008965 A1 * | 7/2001 | Kinn et al. ............ 604/366 |
| 2002/0160259 A1 * | 10/2002 | Kinn et al. ............ 429/144 |
| 2003/0087568 A1 * | 5/2003 | Kinn et al. ............ 442/118 |

OTHER PUBLICATIONS

"Separators for Lithium-Ion Batteries," *Handbook of Battery Materials*, Edited by J. O. Besenhard, Wiley-VCH, 1999, Section 10, pp. 553-563, no month.

"Lithium Ion Batteries," George E. Blomgren, IECEC-98-208, 33$^{rd}$ Intersociety Engineering Conference on Energy Conversion, Colorado Springs, CO, Aug. 1-6, 1998.

"Characterization of Commercially Available Li-ion Batteries," Bradley A. Johnson & Ralph E. White, Center for Electrochemical Engineering, Department of Chemical Engineering, University of South Carolina, Columbia, SC 29208, pp. 1-16, Figures 1-7, no date.

* cited by examiner

*Primary Examiner*—John S. Maples
(74) *Attorney, Agent, or Firm*—Stoel Rives LLP

(57) ABSTRACT

A battery separator having a thermal shutdown mechanism and exhibiting excellent mechanical properties and low electrical resistance includes a water-scavenging and/or acid-scavenging material having reactive functional groups that chemically react with water or acid in the battery to remove the water or acid and thereby improve battery performance. The battery separator preferably includes a first polyolefin providing mechanical integrity and a second polyolefin including the water-scavenging or acid-scavenging reactive functional groups. The battery separator is preferably a microporous film including a polymer matrix throughout which the water-scavenging or acid-scavenging material is dispersed.

14 Claims, 2 Drawing Sheets

BATTERY SEPARATORS CONTAINING REACTIVE FUNCTIONAL GROUPS

RELATED APPLICATIONS

This application claims priority from U.S. Provisional Patent Application No. 60/476,446, filed Jun. 6, 2003.

TECHNICAL FIELD

The present invention relates to a microporous polyolefin film, a battery separator including the film, and a lithium battery made using the separator.

BACKGROUND OF THE INVENTION

The lithium-ion battery market has undergone dynamic growth ever since Sony introduced the first commercial cell in 1991. With their energy densities exceeding 130 Wh/kg and cycle lifetimes of more than 1,000 cycles, lithium-ion battery systems have become increasingly popular in applications such as portable computers, camcorders, and cellular phones. J. Power Sources 70 (1998) pp. 48-54. Lithium-ion batteries are the preferred power source for most portable electronic applications because of their higher energy density, longer cycle life, and higher operational voltage as compared with nickel-cadmium and nickel metal hydride batteries. Lithium-ion batteries also provide advantages when compared with lithium batteries in that they generally use a carbon-based anode as opposed to highly reactive metallic lithium. The carbon anode functions via the intercalation of lithium ions between graphene sheets. The cathode materials most commonly used in lithium-ion batteries are lithium cobalt oxide and lithium manganese oxide.

Lithium-ion batteries are produced in spiral wound and prismatic configurations in which a separator is sandwiched between anode and cathode ribbons. The pores of the separator are then filled with an ionically conductive electrolyte formed by dissolving a salt, for example $LiPF_6$, in an organic solvent, for example, 50:50 ethylene carbonate: dimethyl carbonate. The principal functions of the separator are to prevent electronic conduction (i.e., shorts) between the anode and cathode while permitting ionic conduction via the electrolyte. As such, a preferred separator is insoluble in the organic solvent, chemically stable against the electrolyte and electrode active materials, and includes suitably sized pores in its matrix.

The introduction of the rechargeable lithium-ion battery precipitated a need for separators that did more than serve as inert, porous films. Separators were not only required to provide good mechanical and electrical properties, but they also had to incorporate a thermal shutdown mechanism for improved cell safety under conditions of high temperature, overcharge, or physical penetration of the battery can. Specifically, preferred separators have a so-called "fuse effect" in which upon reaching a specified temperature the separator becomes molten and the separator pores collapse to minimize ionic conduction between the electrodes should the battery overheat or short circuit. The "fuse effect" prevents potential ignition of the electrolyte and explosion of the battery.

Most commercially available lithium-ion batteries include microporous polyolefin separators. Such separators are typically made from polyethylene (PE), polypropylene, or some combination thereof because polyolefins provide excellent mechanical properties and chemical stability at a reasonable cost. Because many polypropylene separators have a shutdown temperature that is too high (>160° C.) for use in lithium-ion applications, PE separators are preferred. However, certain polyolefin separators often do not fully shutdown, because of "hole formation" that results from shrinkage and poor mechanical integrity under pressure and high temperature. In contrast, ultrahigh molecular weight PE (UHMWPE)-based separators have good high temperature integrity and sufficient polymer flow to cause pore collapse, thereby preventing current flow between the electrodes and through the separator. Consequently, UHMWPE-based separators are transformed into a nonporous film upon shutdown. UHMWPE-based separators often include linear low density PE (LLDPE), high density PE (HDPE), low density PE (LDPE), or another form of PE to manipulate the shutdown temperature or shutdown rate without compromising mechanical integrity. In the case of a PE microporous separator, the fuse temperature, i.e., the temperature at which the thermal shutdown is effected, is between about 120° C. and about 150° C. Thus separators containing UHMWPE offer desirable safety features for use in lithium-ion batteries.

Significant research has been done to perfect the shutdown mechanism of the battery separator. However, little research has been done on methods to scavenge adventitious moisture or acid from lithium or lithium-ion batteries. The presence of water molecules and certain acids (e.g., hydrofluoric acid (HF)) in lithium or lithium-ion batteries is detrimental to battery performance because the water or acid can react with the dissolved salt in the electrolyte, the anode, the cathode, or the battery can. These side reactions inhibit battery performance.

It is therefore desirable to provide for use in lithium or lithium-ion batteries a microporous polyolefin separator exhibiting excellent mechanical strength and electrical resistance properties, a thermal shutdown mechanism, and water- or acid-scavenging capability.

SUMMARY OF THE INVENTION

An object of the present invention is to provide for use in a lithium or lithium-ion battery a separator that provides a thermal shutdown mechanism, excellent mechanical integrity and electrical resistance properties, and water-scavenging or acid-scavenging capability such that water or acid molecules in the battery react with functional groups distributed throughout the separator.

The present invention is a battery separator that provides a thermal shutdown mechanism, excellent mechanical integrity, low electrical resistance, and water-scavenging or acid-scavenging capability when used in a lithium battery. The water-scavenging or acid-scavenging capability results from the presence of functional groups that react with water or acid in the battery, thereby improving battery performance through the elimination of parasitic side reactions. The battery separator preferably includes a microporous polymer matrix throughout which the water-scavenging or acid-scavenging groups are dispersed.

In one preferred embodiment, the battery separator includes a first polyolefin that provides sufficient mechanical integrity to form a freestanding film and a second polyolefin that has chemically attached reactive functional groups that effect water or acid removal. A preferred first polyolefin is UHMWPE, and a preferred second polyolefin contains chemically attached anhydride groups.

In a preferred embodiment, the first polyolefin, second polyolefin, and a plasticizer are processed at an elevated temperature and extruded to yield a thin film. Subsequent removal of the plasticizer by an extraction process creates passageways that provide overall fluid permeability to the resulting separator.

Additional objects and advantages of this invention will be apparent from the following detailed description of the preferred embodiments, which proceeds with reference to the accompanying drawings.

DETAILED DESCRIPTION OF PREFERRED EMBODIMENTS

In accordance with the present invention, a battery separator for use in a lithium battery includes a polyolefin with chemically attached water-scavenging or acid-scavenging reactive functional groups that scavenge or effectively remove water or acid from the lithium battery, thereby improving battery performance. The reactive functional groups remove water or acid from the lithium battery by reacting with the water and/or acid in the battery to chemically remove it from the electrolyte.

Figure 1:
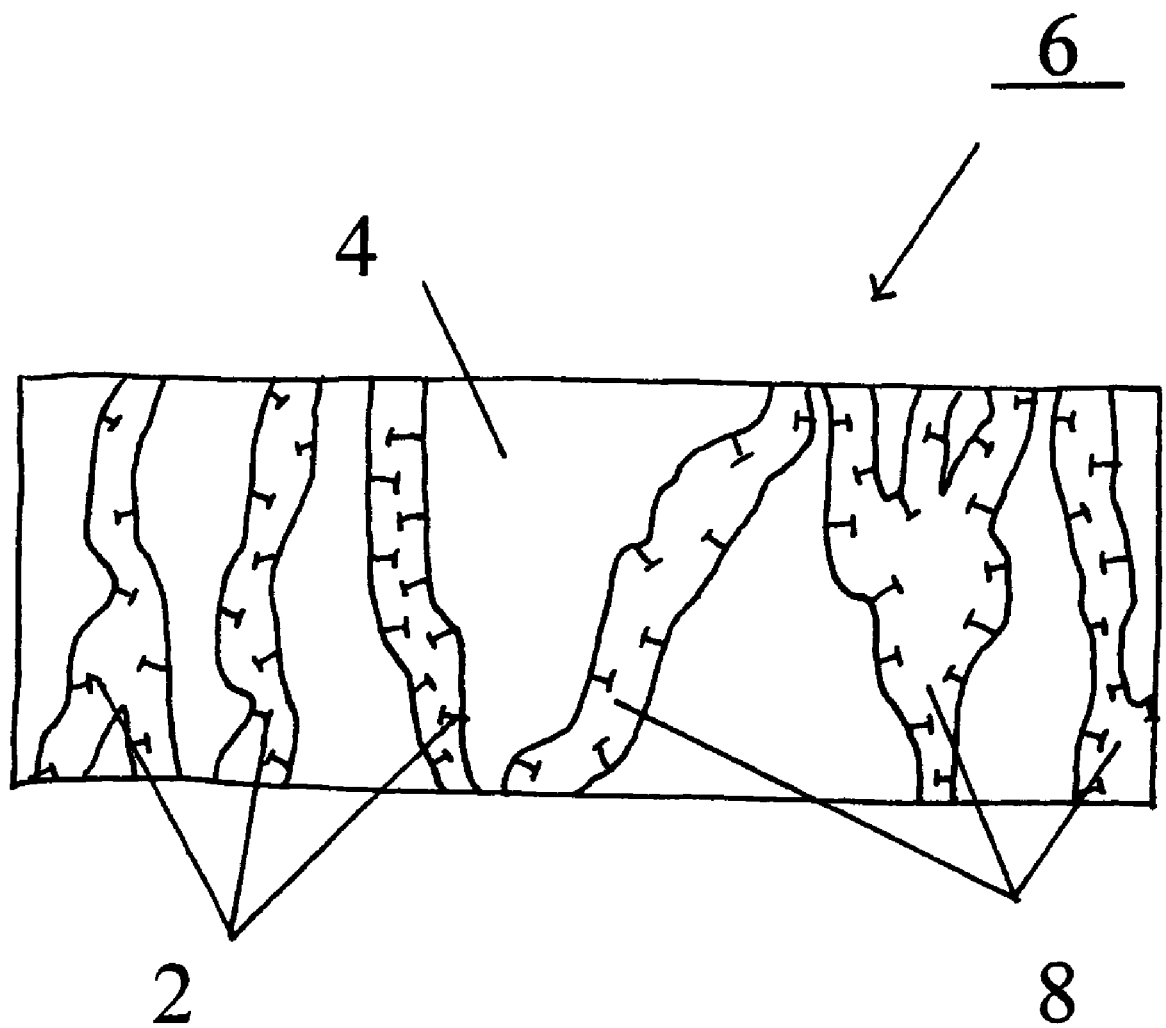
FIG. 1 is a schematic diagram depicting a battery separator throughout which water-scavenging or acid-scavenging functional groups are dispersed.

An exemplary battery separator is depicted in FIG. 1, which is a schematic diagram depicting water-scavenging or acid-scavenging reactive functional groups 2 distributed throughout a polymer matrix 4 of a microporous web 6. During battery operation, web pores 8 are filled with electrolyte (not shown). Water-scavenging or acid-scavenging reactive functional groups 2 are dispersed throughout polymer matrix 4 of web 6, but are primarily functional at the surfaces of web pores 8. Thus FIG. 1 shows water-scavenging reactive functional groups 2 existing in web pores 8.

Polymer matrix 4 preferably includes a first polyolefin and a second polyolefin. The first polyolefin provides sufficient mechanical integrity to form a film with freestanding characteristics, and the second polyolefin has chemically attached reactive functional groups that effect water or acid removal. "Freestanding" refers to a film having sufficient mechanical properties to permit manipulation such as winding and unwinding of the film. The terms "film" and "web" are used interchangeably throughout this patent application.

Various first polyolefins may be used in connection with the formation of the polymer matrix of the battery separator. Preferred first polyolefins include polypropylene, polyethylene (PE), and poly-4-methyl-1-pentene. Preferred types of PE include low density polyethylene (LDPE), linear low density polyethylene (LLDPE), high density polyethylene (HDPE), UHMWPE, low molecular weight PE (LMWPE), and combinations thereof. Preferably one or more of UHMWPE, LDPE, LLDPE, HDPE, or LMWPE are combined. More preferably, UHMWPE is combined with one or more of HDPE, LDPE, or LLDPE. A preferred UHMWPE incorporated into the film is one having an intrinsic viscosity of at least 10 deciliters/gram and preferably greater than about 20 deciliters/gram. Current commercially available UHMWPEs have an upper limit of intrinsic viscosity of about 40 deciliters/gram.

Various second polyolefins may be used in connection with the formation of the polymer matrix of the battery separator. The second polyolefin is preferably an anhydride-containing polymer, but may be any polyolefin that is compatible with the components in a lithium or lithium-ion battery and that chemically reacts with the water or acid in a battery to effectively remove the water or acid from the battery. Exemplary water-scavenging and acid-scavenging materials include chemically modified polyolefins. An exemplary commercially available water-scavenging and/or acid-scavenging materials is Integrate™ NE 556-P35, manufactured by Equistar Chemical Company.

While various processes known to those of skill in the art may be used to create the battery separator of the present invention, the "wet" method is preferred. The "wet" method involves combining a first polyolefin, a second polyolefin that includes water-scavenging reactive functional groups, and any other desired ingredients with a liquid, non-volatile plasticizer. The resulting mixture or slurry is injected into the feed port of a twin-screw extruder and subjected to elevated temperatures and shear. The mixture or slurry is extruded through a die, and sufficient plasticizer is extracted from the resulting film to form a microporous separator. An example of this method is as follows:

EXAMPLE

UHMWPE (37.5 kg, GUR™ 4120, manufactured by Ticona), HDPE powder (25 kg, Alathon™ L5005, less than 35 mesh, manufactured by Equistar), lithium stearate (0.72 kg, manufactured by Norac), antioxidant (0.59 kg, Irganox™ B215, manufactured by Ciba), and a plasticizer (111.1 kg, Hydrocal™ 800, manufactured by Calumet) were blended together in a Ross VMC-100 mixer. Maleic anhydride-modified polyolefin powder (0.027 kg, NE 556 P35, manufactured by Equistar) and additional plasticizer (0.91 kg) were added to 4.5 kg of the above mixture to form a 30% w/w polymer slurry. This slurry was pumped into a 40 mm twin screw extruder (manufactured by Betol) at a rate of approximately 5.4 kg/hr while a melt temperature of approximately 208° C. was maintained. The extrudate passed through a melt pump (37 rpm; 3 cc/rev) that fed a 49.5 mm diameter annular die having a 1.9 mm gap. The extrudate was inflated with air to produce a 300 mm neck length and a biaxially oriented film with a 356 mm layflat that was passed through an upper nip at 305 cm/min. A 100 mm×200 mm sample was cut from the plasticizer-filled sheet and restrained on four sides in a metal frame. The restrained sample was fully extracted in a trichloroethylene (TCE) bath and dried in a circulating air oven at 80° C. The resulting UHMWPE-based separator had 62% porosity and a thickness of 26.7 micrometers.

A preferred plasticizer is a nonevaporative solvent for the first and second polyolefins and is preferably liquid at room temperature. The plasticizer has little or no solvating effect on the polyolefins at room temperature; it performs its solvating action at temperatures at or above the softening temperature of the polyolefins. For UHMWPE, the solvating or gelling temperature would be above about 160° C., and preferably in the range of between about 160° C. and about 240° C. Exemplary suitable plasticizers include paraffinic oil, naphthenic oil, aromatic oil, or a mixture of two or more such oils. Exemplary suitable commercial processing oils include Hydrocal™ 800, manufactured by Calumet, oils sold by Shell Oil Company (such as ShellFlex™ 3681, Gravex™ 41, and Catnex™ 945), oils sold by Chevron Oil Company (such as Chevron 500R), and oils sold by Lyondell Oil Company (such as Tufflo™ 6056). In some cases, it is desirable to select the processing oil such that any residual oil in the polymer sheet after extraction is electrochemically inactive.

Preferred solvents for use in extracting the processing oil from the film are not deleterious to the functional groups contained in the polymer matrix and have a boiling point that makes it practical to separate the solvent from the plasticizer by distillation. Exemplary solvents include 1,1,2 trichloroethylene, perchloroethylene, 1,2-dichloroethane, 1,1,1-trichloroethane, 1,1,1-trichloroethane, TCE, methylene chloride, chloroform, 1,1,2-trichloro-1,2,2-trifluoroethane, isopropyl alcohol, diethyl ether, acetone, hexane, heptane, and toluene.

Exemplary additional ingredients incorporated into the UHMWPE web include antioxidants, colorants, pigments, residual plasticizer or processing oil, waxes, lubricants, other polymers, fillers (e.g., silica, alumina, and boron nitride), and processing aids.

The practice of the invention is not limited to a specific separator composition, geometry, or thickness. For example, the separator may be of a monolayer or multi-layer geometry. One exemplary multi-layer separator geometry involves positioning each of two PP films adjacent a PE film. While not limited to a specific thickness, exemplary battery separators in accordance with the present invention have a thickness ranging from about 8 micrometers to about 50 micrometers, which falls within the preferences of lithium and lithium-ion battery manufacturers.

Figure 2:
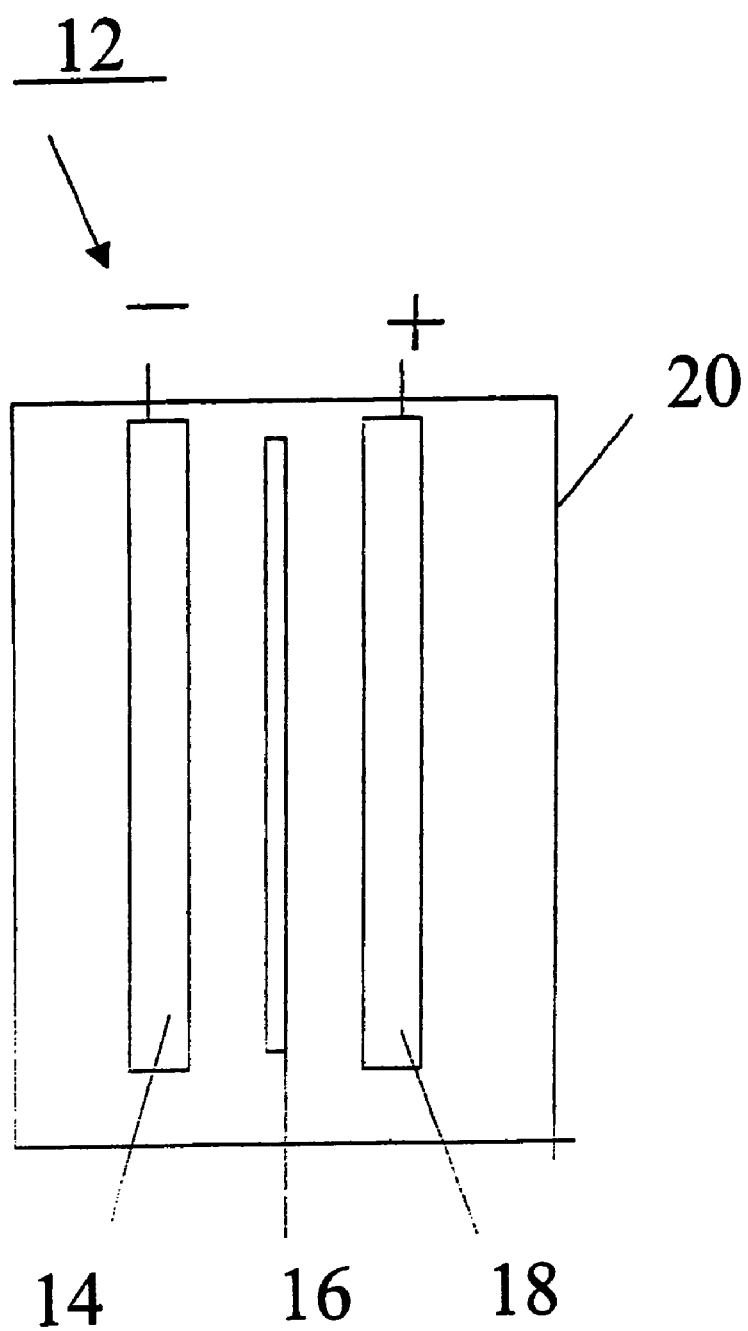
FIG. 2 is a schematic diagram depicting a multilayer electrode assembly for use in a lithium-ion battery.

A preferred implementation of the battery separator of the present invention is the inclusion of the microporous separator in a multilayer electrode assembly for use in a lithium or lithium-ion battery. The use of the battery separator of the present invention in a lithium-ion battery is depicted in FIG. 2. Lithium-ion batteries convert chemical energy to electrical energy. The multilayer electrode assembly 12 depicted in FIG. 2 includes a negative electrode (anode) 14, a separator 16, a positive electrode (cathode) 18, and current collectors (not shown). An operational lithium-ion battery includes an ionically conductive electrolyte, which is not shown in FIG. 2, and a container 20 that surrounds anode 14, separator 16, cathode 18, and the current collectors. A preferred polyolefin film has sufficient porosity to allow the electrolyte to rapidly wick through it.

A wide variety of electrochemically active materials can be used to form anode 14 and cathode 18, as is commonly known in the art. Exemplary cathodes include lithium nickel oxide, lithium cobalt oxide, and lithium manganese oxide as well as any type of hybrid lithium oxide, e.g., lithium nickel cobalt oxide. Exemplary preferred anodes are carbon-based anodes including crystalline or amorphous carbonaceous materials in the form of fiber, powder, or microbeads, natural or synthetic graphite, carbon black, coke, mesocarbon microbeads, or activated carbon.

There are two types of electrolyte systems commonly used in lithium-ion batteries. The first type of commonly used electrolyte system is a liquid electrolyte system in which a liquid electrolyte is used to provide sufficient ionic conduction between electrodes that are packaged in a cylindrical or prismatic metal can. The second type of commonly used electrolyte system is a gel electrolyte system in which a gel electrolyte is sandwiched between the electrodes. Either type of electrolyte system, or any combination thereof, may be implemented in the battery of the present invention.

It will be obvious to those having skill in the art that many changes may be made to the details of the above-described embodiments without departing from the underlying principles of the invention. The scope of the present invention should, therefore, be determined only by the following claims.

The invention claimed is:

1. A multi-layer electrode assembly, comprising:
    a separator layer positioned between an anode layer and a cathode layer;
    the separator layer formed as a microporous film including a polymer matrix comprising a first polyolefin and a second polyolefin, the first polyolefin providing mechanical integrity to the separator layer and the second polyolefin including anhydride functional groups that provide a water-scavenging property, an acid-scavenging property, or both, to the separator layer; and
    each of the anode layer and cathode layer including a material composition having electrical conductivity properties.

2. The electrode assembly of claim 1, in which the first polyolefin is selected from the group consisting of polypropylene, LDPE, LLDPE, HDPE, UHMWPE, low molecular weight PE, poly-4-methyl-1-pentene, and combinations thereof.

3. The electrode assembly of claim 1, in which the separator layer includes multiple layers.

4. The electrode assembly of claim 1, in which the separator layer is a monolayer.

5. A freestanding, microporous film for use as a battery separator in a lithium battery, comprising:
    a polymer matrix including first and second polyolefins; and
    one of the first and second polyolefins including anhydride functional groups that provide a water-scavenging capability, an acid-scavenging capability, or both, to the microporous film by effecting a chemical reaction that results in effective removal of, respectively, water, acid, or both, from the lithium battery.

6. The microporous film of claim 1, in which the lithium battery is selected from the group consisting of a primary lithium battery and a lithium-ion battery.

7. The microporous film of claim 1, in which the first polyolefin is selected from the group consisting of polypropylene, LDPE, LLDPE, HDPE, UHMWPE, low molecular weight PE, poly-4-methyl-1-pentene, and combinations thereof.

8. A freestanding, microporous film having passageways that provide overall fluid permeability for use as a battery separator in a lithium battery, comprising:
    a polymer matrix including a first polyolefin that provides mechanical integrity to the microporous film and a second polyolefin including anhydride functional groups that provide a water-scavenging capability, an acid-scavenging capability, or both, to the microporous film by effecting a chemical reaction that results in effective removal of, respectively, water, acid, or both, from the lithium battery.

9. The microporous film of claim 8, in which the lithium battery is selected from the group consisting of a primary lithium battery and a lithium-ion battery.

10. The microporous film of claim 8, in which the first polyolefin is selected from the group consisting of polypropylene, LDPE, LLDPE, HDPE, UHMWPE, low molecular weight PE, poly-4-methyl-1-pentene, and combinations thereof.

11. The microporous film of claim 8, in which the anhydride functional groups are primarily functional in the passageways of the microporous film.

12. The microporous film of claim 8, in which the microporous film is formed as an extruded film.

13. The microporous film of claim 8, in which the battery separator is of a multi-layer geometry that includes multiple films.

14. The microporous film of claim 8, in which the battery separator is a monolayer separator including a single film.

* * * * *